F. HOFLEY.
FLYTRAP.
APPLICATION FILED SEPT. 15, 1920.
1,387,716.  Patented Aug. 16, 1921.
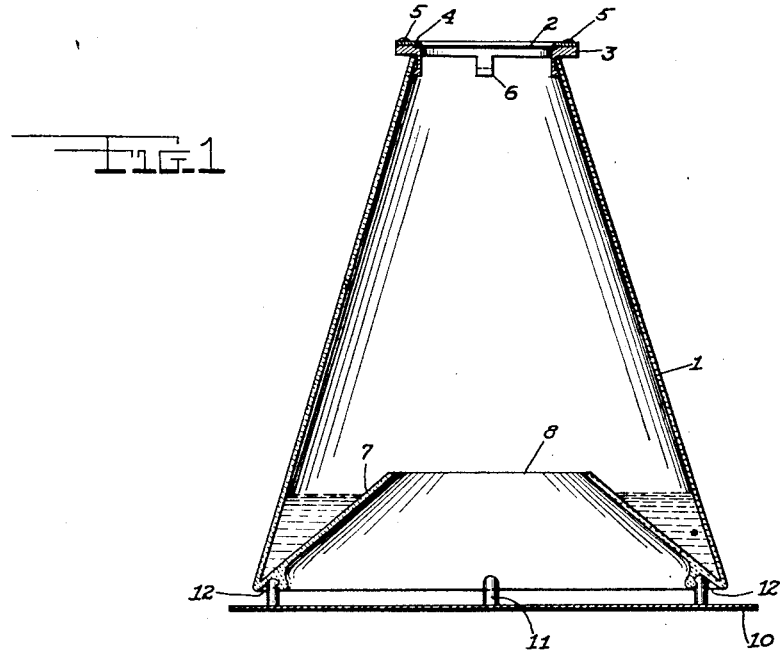
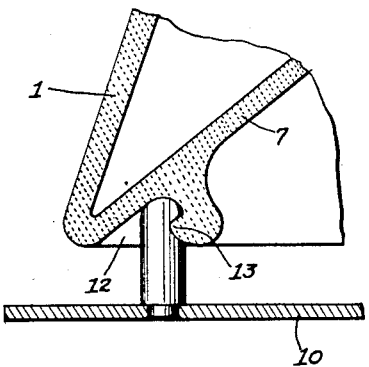
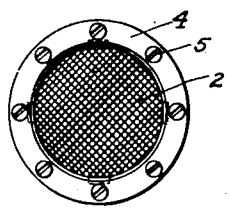
INVENTOR
FRANCES *Hofley*
BY
ATTORNEY

UNITED STATES PATENT OFFICE.

FRANCES HOFLEY, OF LAMPMAN, SASKATCHEWAN, CANADA.

FLYTRAP.

1,387,716.  Specification of Letters Patent.  Patented Aug. 16, 1921.

Application filed September 15, 1920. Serial No. 410,458.

*To all whom it may concern:*

Be it known that I, FRANCES HOFLEY, a citizen of Czecho-Slovakia, residing at Lampman, Province of Saskatchewan, and Dominion of Canada, have invented certain new and useful Improvements in Flytraps, of which the following is a specification.

This invention relates to fly-traps, and it has for an object to provide a cheap trap of this kind which will be characterized by a high degree of efficiency, and which will also be of pleasing appearance.

For further comprehension of the invention, and of the objects and advantages thereof, reference will be had to the following description, and accompanying drawings, and to the appended claim in which the various novel features of the invention are more particularly set forth.

Figure 1 of the drawings is a central vertical sectional view of a fly-trap constructed according to my invention.

Fig. 2 is an enlarged fragmentary vertical section showing the lower marginal portion of the trap.

Fig. 3 is a plan view of the cover.

As here shown my improved trap comprises a hollow body 1 in the form of a frustum of a cone which is preferably made of glass, this body forming the trap chamber. The top of this body is provided with a cap formed by a wire mesh screen 2 which seats at its edges on a ring 3 to which it is attached by a clamping ring 4, the latter being secured to rings 3 by screws 5. The ring 3 rests on the top of the body 1 and is provided with the resilient prongs 6 which project downwardly into the latter and, by engaging the converging inner surface thereof, hold the cap in position.

The bottom of this body 1 is formed by a second frustum, conical member 7, which projects inwardly and upwardly at a comparatively small angle to the horizontal from the lower edges of the member 1 and has a central opening 8 through which the fly enters the trap. The inclined bottom member 7 provides an annular receptacle in the bottom of the trap chamber in which a soapy liquid or any suitable material may be placed.

The trap chamber is supported upon and spaced from a base plate 10 of resilient material from which a series of studs or claws 11 project upwardly into pockets 12 on the underside of the bottom 7 which have projections 13 with which the claws interlock. By springing down the base at its sides, the claws may be withdrawn from the pockets to disengage the base from the body.

In case a quantity of sugar or like material is placed on the base 10 under the opening 8, the flies enter the trap through the space under the trap chamber to feed on the sugar and afterward fly upwardly into the trap chamber when the fumes from the material act upon them causing them to fall thereinto.

Having thus described my invention, what I claim as new and desire to secure by Letters Patent of the United States is as follows—

A fly-trap comprising a hollow smooth-sided body of frusto-conical form, a foraminous cover for said body, resilient prongs on said cover holding the latter upon the said body, a base plate of resilient material provided with pockets, claws projecting up from said base plate into said pockets, and cooperating projections upon said body adapted to interlock with said claws to secure the base plate to the body at a distance from the latter.

In testimony whereof I have affixed my signature.

MRS. FRANCES HOFLEY.